(12) United States Patent
Takimoto et al.

(10) Patent No.: US 7,766,375 B2
(45) Date of Patent: Aug. 3, 2010

(54) PEDESTRIAN AIRBAG APPARATUS

(75) Inventors: Takayuki Takimoto, Tokyo (JP); Hiroyuki Takahashi, Aichi (JP)

(73) Assignee: Takata Corporation, Tokyo (JP)

( * ) Notice: Subject to any disclaimer, the term of this patent is extended or adjusted under 35 U.S.C. 154(b) by 195 days.

(21) Appl. No.: 12/087,596

(22) PCT Filed: Jan. 9, 2007

(86) PCT No.: PCT/JP2007/050082

§ 371 (c)(1),
(2), (4) Date: Jul. 10, 2008

(87) PCT Pub. No.: WO2007/086247

PCT Pub. Date: Aug. 2, 2007

(65) Prior Publication Data

US 2009/0033071 A1 Feb. 5, 2009

(30) Foreign Application Priority Data

Jan. 25, 2006 (JP) .............................. 2006-016324

(51) Int. Cl.
*B60R 21/34* (2006.01)
(52) U.S. Cl. ................. 280/730.1; 280/728.3
(58) Field of Classification Search ............. 280/728.2, 280/728.3, 730.1; *B60R 21/34*
See application file for complete search history.

(56) References Cited

U.S. PATENT DOCUMENTS 6,460,874 B1 * 10/2002 McDonnell et al. ...... 280/728.2
2004/0188986 A1 * 9/2004 Rogers et al. ............. 280/728.3
2005/0206139 A1 * 9/2005 Mori et al. ................ 280/730.1
2007/0040359 A1 * 2/2007 Chen et al. ................ 280/728.3

FOREIGN PATENT DOCUMENTS

| JP | H05-246293 | 9/1993 |
|---|---|---|
| JP | H10-016699 | 1/1998 |
| JP | H11-059312 | 3/1999 |
| JP | H11-342816 | 12/1999 |
| JP | 2003-182487 A | 7/2003 |
| JP | 2005-280556 | 10/2005 |
| WO | WO 2007/042908 A1 | 4/2007 |

\* cited by examiner

*Primary Examiner*—Ruth Ilan
(74) *Attorney, Agent, or Firm*—Manabu Kanesaka

(57) ABSTRACT

A pedestrian airbag apparatus in which smooth inflation and deployment of an airbag are achieved without using an inflator having a high output is provided. An opening 3a for allowing passage of the airbag provided on a bonnet hood 3 is covered by a lid 20. A rear edge 20r of the lid 20 is rotatably joined to the rear edge side of the opening 3a via hinges 21, and a front edge 20f and the rear edge 20r of the lid 20 are disengageably engaged with a peripheral edge portion of the opening 3a by clips 30, respectively. The clips 30 on the front edge 20f side and the hinges 21 on the rear edge 20r side are arranged so as to be shifted in the vehicle width direction. The clips 30 on the front edge 20f side and the clips 30 on the rear edge 20r side are arranged so as to be shifted in the vehicle width direction.

8 Claims, 3 Drawing Sheets

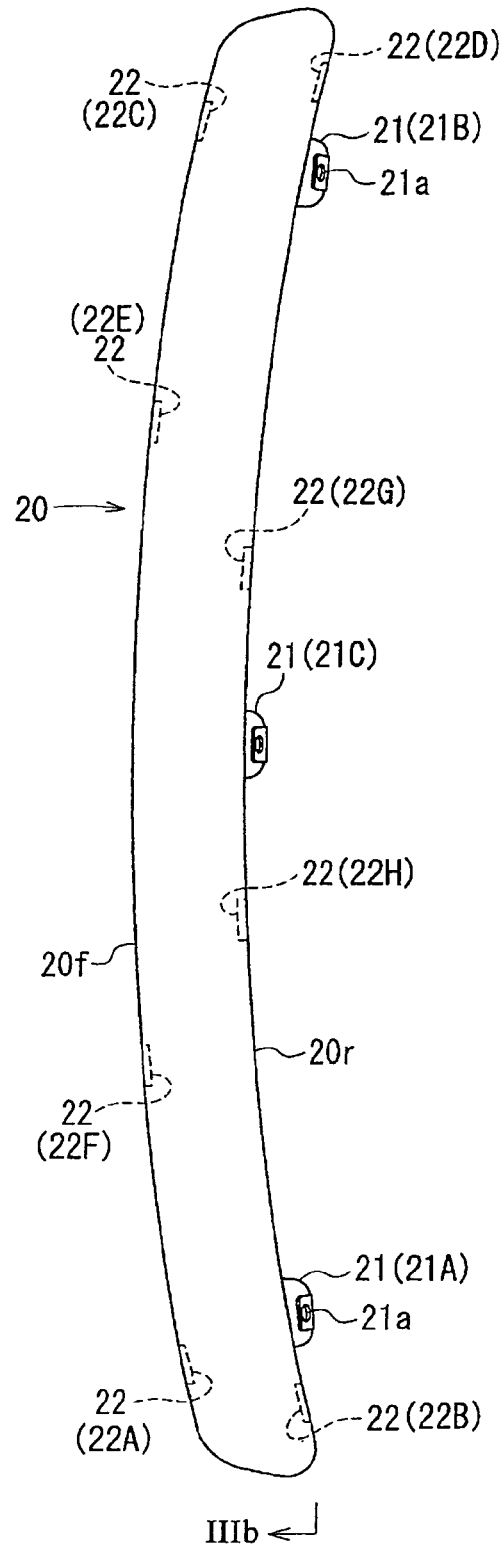
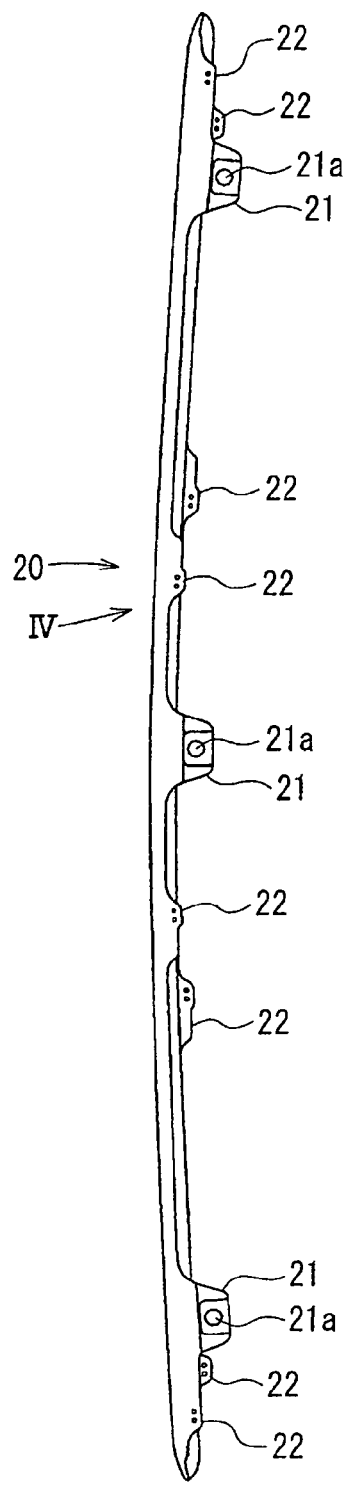
Fig. 3a
Fig. 3b

PEDESTRIAN AIRBAG APPARATUS

TECHNICAL FIELD

The present invention relates to a pedestrian airbag apparatus having an airbag which is inflated along at least part of a hood of a vehicle body and, more specifically, to a pedestrian airbag apparatus in which an airbag is stored in a case extending in the vehicle width direction.

BACKGROUND ART

A pedestrian airbag apparatus configured to receives a pedestrian or the like (pedestrian, bicycle rider, or the like) by inflating an airbag along a portion near a cowl portion of a vehicle body is known. As a mode of this pedestrian airbag apparatus, a pedestrian airbag apparatus in which an airbag is stored in a case extending in the vehicle width direction is known (Japanese Unexamined Patent Application Publication NO. 2005-280556).

In the publication shown above, the case is arranged right below an opening provided on a rear portion of a hood. A lid (which is referred to as an airbag cover in this publication) is provided so as to cover the opening. The lid is secured to the case. The lid is provided with a tear line (portion to be broken), and the lid is torn along the tear line when the airbag is inflated, and the airbag is inflated and deployed on the hood.

[Patent Document 1] Japanese Unexamined Patent Application Publication NO. 2005-280556

DISCLOSURE OF INVENTION

It is an object of the present invention to provide a pedestrian airbag apparatus in which smooth inflation and deployment of an airbag are achieved without using an inflator having a high output.

A pedestrian airbag apparatus according to the present invention includes an airbag which is inflated along at least part of a rear portion of a hood, a case extending in the vehicle width direction and including the airbag stored therein, an inflator for inflating the airbag and a lid arranged above the case, the lid being rotatably connected at a first edge which is one of a front edge and a rear edge thereof to a vehicle body via a hinge and being engaged at a second edge thereof which is the other one of the front edge and the rear edge with the vehicle body by a second edge engaging portion, and is characterized in that the positions of the hinges at the first edge and the positions of the second edge engaging portions are shifted in the vehicle width direction.

BRIEF DESCRIPTION OF DRAWINGS

FIG. 3 is an explanatory drawing of a lid.

BEST MODE FOR CARRYING OUT THE INVENTION

Figure 1:
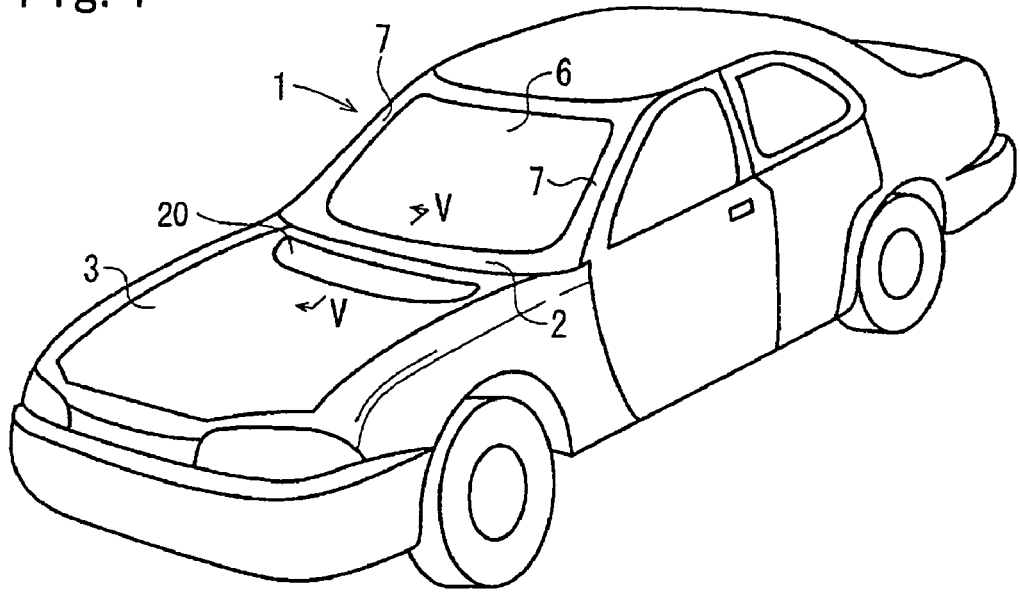
FIG. 1 is a perspective view of an automotive vehicle provided with a pedestrian airbag apparatus according to an embodiment.

In a pedestrian airbag apparatus in which an airbag is stored in a case extending in the vehicle width direction, it is considered that a rear edge of a lid is secured to a vehicle body on the rear edge side of an opening of a hood via a hinge and a front edge of the lid is disengageably engaged with the vehicle body on the front edge side of the opening.

In this case, when the engaging portion at the front edge of the lid and the hinge are arranged at the same position in the vehicle width direction, the space between the engaging portion and the hinge is smaller than other portion, so that a frictional force that the airbag is applied by the case when the airbag is inflated and deployed is locally high.

Consequently, in order to achieve smooth inflation and deployment of the airbag, an inflator having a high output is required.

In contrast, the pedestrian airbag apparatus in the present invention includes an airbag which is inflated along at least part of a rear portion of a hood of a vehicle body, a case extending in the vehicle width direction and including the airbag stored therein, an inflator for inflating the airbag and a lid arranged above the case, the lid being rotatably connected at a first edge which is one of a front edge and a rear edge thereof to a vehicle body via a hinge and being engaged at a second edge which is the other one of the front edge and the rear edge thereof with the vehicle body by a second edge engaging portion, and the positions of the hinges at the first edge and the positions of the second edge engaging portions are shifted in the vehicle width direction.

The expression "the positions of the hinges at the first edge of the lid and the positions of the second edge engaging portions are shifted in the vehicle width direction" means that the second edge engaging portion faces a position between an end portion of the first edge and the hinge located at a position closest to the end portion or a position between adjacent hinges of the first edge at least partly in the vehicle width direction.

In the pedestrian airbag apparatus in the present invention, since the hinge at the first edge which is one of the front edge and the rear edge of the lid and the second edge engaging portion at the other one of those are arranged so as to be shifted from each other in the vehicle width direction, the space between the second edge engaging portion and the hinge is not excessively small, so that the smooth inflation and deployment of the airbag are achieved.

The pedestrian airbag apparatus in the present invention may also be configured in such a manner that the first edge of the lid is further engaged with the vehicle body by first edge engaging portions and the positions of the first edge engaging portions and the positions of the second edge engaging portions may be shifted in the vehicle width direction.

When the first edge is joined to the vehicle body via the hinge and the first edge is engaged with the vehicle body by the first edge engaging portions, it is preferable to arrange the first edge engaging portions of the first edge and the second edge engaging portions so as to be shifted in the vehicle width direction. Accordingly, since the space between the first edge engaging portion and the second edge engaging portion is not excessively small, the smooth inflation and deployment of the airbag are achieved.

The expression "the first edge engaging portions and the second edge engaging portions are shifted in the vehicle width direction" means that the first edge engaging portion faces a position between an end portion of the second edge and the second edge engaging portion located at a position closest to the end portion or a position between adjacent second edge engaging portions of the second edge at least partly in the vehicle width direction.

Referring now to the drawings, the embodiment of the present invention will be described.

Figure 2:
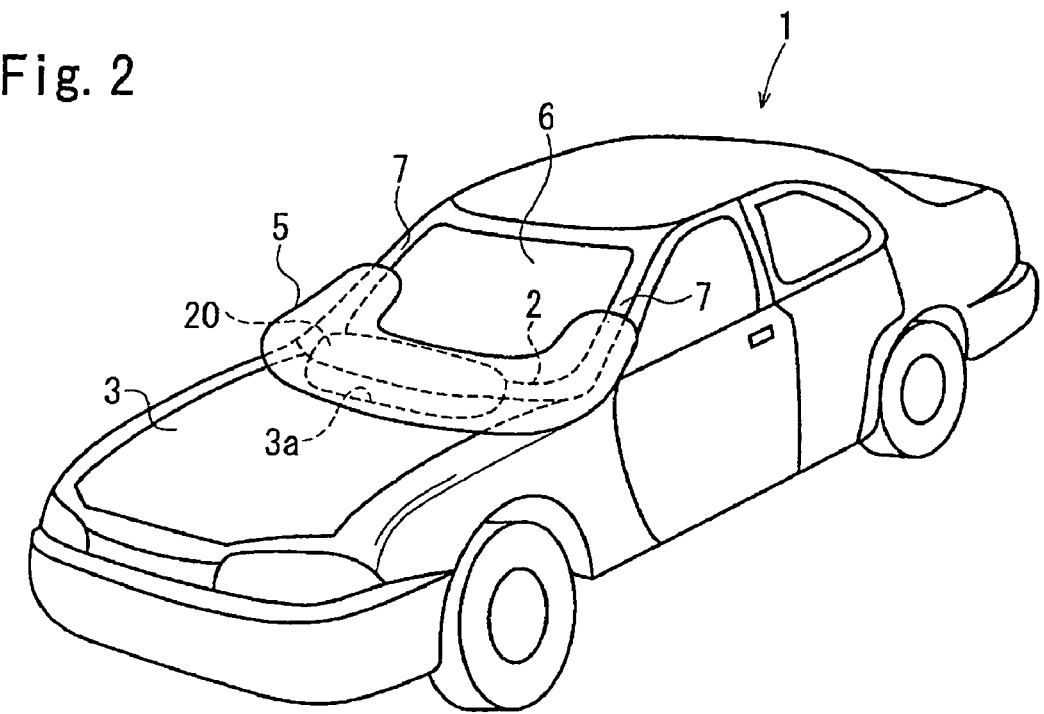
FIG. 2 is a perspective view of the automotive vehicle shown in FIG. 1 when an airbag is inflated.
Figure 4:
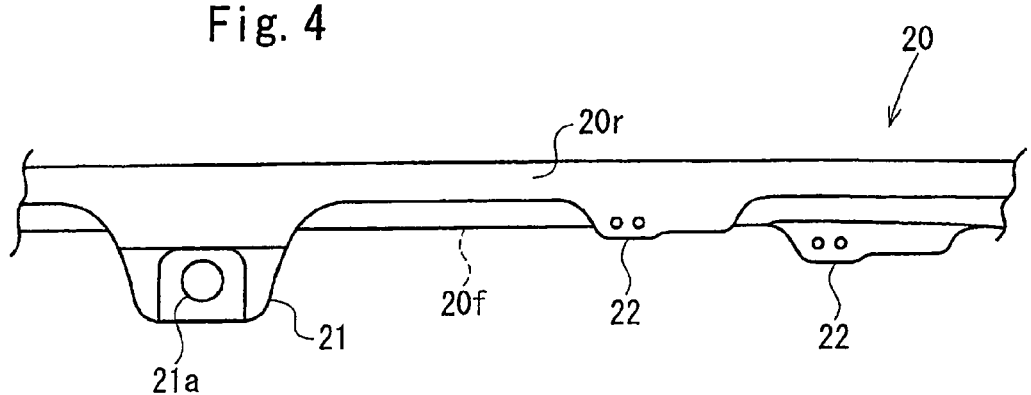
FIG. 4 is an enlarged drawing of a portion IV in FIG. 3.
Figure 5:
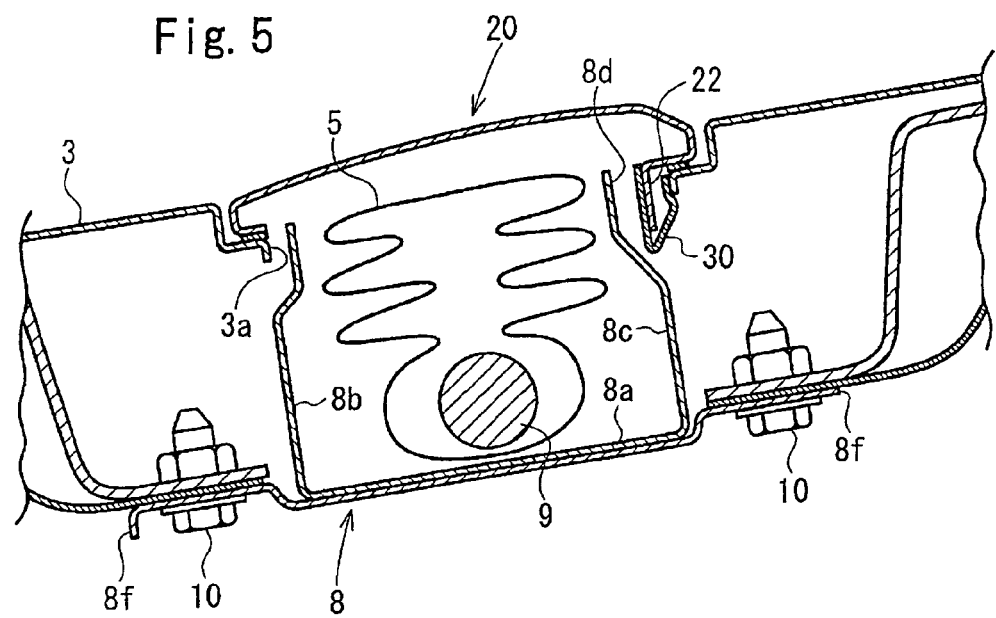
FIG. 5 is an enlarged cross-sectional view taken along a line V-V in FIG. 1.

FIG. 1 is a perspective view of an automotive vehicle provided with a pedestrian airbag apparatus according to the embodiment; FIG. 2 is a perspective view of the automotive vehicle shown in FIG. 1 when an airbag is inflated; FIG. 3a is a plan view of a lid of the pedestrian airbag apparatus, FIG. 3b is a drawing of the lid viewed in the direction of arrows IIIb-IIIb in FIG. 3a; FIG. 4 is an enlarged drawing of a portion IV in FIG. 3b; and FIG. 5 is an enlarged cross-sectional view taken along a line V-V in FIG. 1. In FIGS. 3a, 3b and FIG. 4, a clip 30 is not shown in the drawing, and a seat 22 for attaching the clip 30 is shown.

As shown in FIG. 1, an automotive vehicle 1 is a four-door sedan in this embodiment. However, the present invention is not limited to a specific type of the vehicle.

A pedestrian airbag apparatus 4 is installed at a rear portion of a bonnet hood 3 of the automotive vehicle 1, and the bonnet hood 3 is provided with an opening 3a for allowing passage of an airbag of the pedestrian airbag apparatus 4. The opening 3a extends in the vehicle width direction along a rear edge of the bonnet hood 3. In this embodiment, the opening 3a is curved into a substantially circular segment shape which is protruded at the center portion thereof in the vehicle width direction toward the vehicle front side.

As shown in FIG. 2, when an airbag 5 of the pedestrian airbag apparatus 4 is inflated on the vehicle upper side through this opening 3a, at least parts of a rear edge portion of the bonnet hood 3, a cowl top 2, a windshield 6 and left and right A-pillars 7 are covered by the inflated airbag 5.

As shown in FIG. 5, the pedestrian airbag apparatus 4 includes a case 8 for storing the folded airbag 5, an inflator 9 for inflating the airbag 5 and a lid 20 for covering the opening 3a.

The case 8 is an elongated box-shaped member extending in the vehicle width direction. The case includes a bottom portion 8a, a front wall portion 8b, a rear wall portion 8c and left and right end walls (not shown), and an upper surface is opened. A flange 8f for attaching the case 8 to the bonnet hood 3 is extended from side peripheral surfaces of the case 8. The case 8 is arranged on the back side of the bonnet hood 3 so that the opened portion on top faces the opening 3a, and the flange 8f is fixed to the bonnet hood 3 by a fixture 10 such as bolt.

The case 8 has a shape curved into a substantially circular segment shape which is protruded at the center portion thereof in the vehicle width direction toward the vehicle front side in plan view as the opening 3a, and the opening shape of the opened portion on top substantially matches the opening 3a.

A folded member of the airbag 5 is disposed in the case 8 from one end to the other end in the longitudinal direction of the case 8.

The lid 20 has a band-shape which continuously covers the opening 3a from the one end to the other end in the longitudinal direction and, as shown in FIG. 3a, a front edge 20f and a rear edge 20r follow the opening 3a so as to have a shape curved into a substantially circular segment shape which is protruded at the center portion thereof in the vehicle width direction toward the vehicle front side.

In this embodiment, hinges 21 formed into the projecting strip shape are provided at three positions; both ends in the longitudinal direction and at the center in the longitudinal direction of the rear edge 20r of the lid 20. The hinges 21 each are provided with a hole 21a for inserting a fixture (not shown) such as a rivet or a bolt. However, the number or the arrangement of the hinges 21 and a joint structure with respect to the vehicle body are not limited thereto.

In this embodiment, a plurality of (four each in this embodiment) the seats 22 for attaching the clips are provided on the front edge 20f and the rear edge 20r of the lid 20 at spaces in the longitudinal direction of the lid 20. As shown in FIG. 4 in an enlarged scale, the respective seats 22 are each formed into a projecting strip projecting downward from the front edge 20f and the rear edge 20r of the lid 20. The respective seats 22 each are provided by the clip 30 as an engaging portion for engaging the lid 20 to the vehicle body (at a peripheral edge portion of the opening 3a in this embodiment).

As shown in FIG. 5, the clip 30 is formed of a leaf spring strip formed into substantially J-shape in this embodiment, is secured at one end to the seat 22, and is protruded at the other end to the front or rear (the other end side of the each clip 30 on the front edge 20f side is protruded toward the front and the other end side of each clip 30 on the rear edge 20r side is protruded toward the rear) so as to extend continuously to the lower side of the peripheral edge portion of the opening 3a when the lid 20 is fitted to the opening 3a.

As shown in FIG. 3a, FIG. 3b and FIG. 4, the positions of the respective clips 30 on the front edge 20f side of the lid 20 (in the respective drawings shown above, it is shown as the position of the seat 22) are shifted in the vehicle width direction (in the longitudinal direction of the lid 20) from the positions of the respective hinges 21 on the rear edge 20r side. The positions of the respective clips 30 on the front edge 20f side and positions of the respective clips 30 on the rear edge 20r side are shifted in the vehicle width direction.

The leftmost hinge 21 (21A) in the vehicle width direction is apart from the left end of the lid 20. The clip 30 and the seat 22 (22A) therefore are arranged at the front edge 20f of the lid 20 so as to face a position between the leftmost hinge 21A and the left end of the lid 20.

The clips 30 and the seat 22 (22B) therefor are arranged on the rear edge 20r of the lid between the leftmost hinge 21A and the left end of the lid 20. The seat 22B is shifted from the seat 22A in the vehicle width direction.

The rightmost hinge 21 (21B) in the vehicle width direction is apart from the right end of the lid 20. The clip 30 and the seat 22 (22C) therefor are arranged at the front edge 20f of the lid 20 so as to face a position between the rightmost hinge 21B and the right end of the lid 20.

The clip 30 and the seat 22 (22D) therefor are arranged at the rear edge 20r of the lid between the rightmost hinge 21B and the right end of the lid 20. The seat 22D is shifted from the seat 22C in the vehicle width direction.

The clip 30 and the seat 22 (22E) therefor are arranged at the front edge 20f of the lid 20 so as to face a position between the center hinge 21 (21C) and the right hinge 21B.

The clip 30 and the seat 22 (22F) therefor are arranged at the front edge 20f of the lid 20 so as to face a position between the center hinge 21 (21C) and the left hinge 21A.

The clip 30 and the seat 22 (22G) therefor are arranged at the rear edge 20r of the lid 20 between the center hinge 21 (21C) and the right hinge 21B. The seat 22G is shifted from the seat 22E in the vehicle width direction.

The clip 30 and the seat 22 (22H) therefor are arranged at the rear edge 20r of the lid 20 between the center hinge 21 (21C) and the left hinge 21A. The seat 22H is shifted from the seat 22F in the vehicle width direction.

When mounting the lid 20 to the opening 3a, the lid 20 is covered by pushing the respective clips 30 into the opening 3a. Accordingly, the respective clips 30 engage the back side of the peripheral edge portion of the opening 3a while being resiliently deformed, so that the lid 20 is engaged with the peripheral edge portion of the opening 3a. Then, the respective hinges 21 on the rear edge 20r side of the lid 20 are secured to the rear edge side of the opening 3a with fixtures such as rivets or bolts.

As shown in FIG. 5, recesses 8d depressed inwardly of the case 8 so as to avoid interference by the clips 30, are formed on the front wall portion 8b and the rear wall portion 8c of the case 8 at positions opposing the respective clips 30 when mounting the lid 20 to the opening 3a. However, in FIG. 5, only the recess 8d on the side of the rear wall portion 8c is shown in the drawing.

As a matter of course, the recesses on the side of the front wall portion 8b and the recesses 8d on the side of the rear wall portion 8c are also arranged so as to be shifted in the vehicle width direction (or the longitudinal direction of the case 8).

When the pedestrian collides with the automotive vehicle having the pedestrian airbag apparatus 4 configured in this manner, the inflator 9 is activated on the basis of the detection signal of a pedestrian impact detection sensor (not shown), and the airbag 5 starts inflation by the injection gas therefrom. Engagement of the lid 20 by the respective clips 30 is released by being pressed by the inflating airbag 5, and the lid 20 is opened rearward about the respective hinges 21, so that the airbag 5 is deployed along the outer surface of the vehicle body as shown in FIG. 2.

In the pedestrian airbag apparatus 4, since the positions of arrangement of the respective clips 30 attached respectively to the seats 22A, 22F, 22E and 22C on the front edge 20f side of the lid 20 and the positions of arrangement of the respective hinges 21 on the rear edge 20r side are shifted in the vehicle width direction, the spaces between the respective clips 30 on the front edge 20f side and the respective hinges 21 on the rear edge 20r side are not excessively small, so that increase in frictional force applied to the airbag 5 when it passes therebetween may be restrained, and hence the smooth inflation and deployment of the airbag 5 are achieved.

In this embodiment, the rear edge 20r of the lid 20 is also engaged with the peripheral edge portion of the opening 3a by the clips 30 attached respectively to the seats 22B, 22H, 22G and 22D. However, since the positions of arrangement of the respective clips 30 on the front edge 20f side of the lid 20 and the positions of arrangement of the respective clips 30 on the rear edge 20r side are shifted in the vehicle width direction, the spaces, that is, the distances between the respective clips on the front edge 20f side and on the rear edge 20r side from each other are not excessively small. In particular, in this embodiment, the space between the respective recesses 8d on the side of the front wall portion 8b of the case 8 and the respective recesses 8d on the side of the rear wall portion 8c, which are depressed inwardly of the case 8 so as to avoid the interference by the respective clips 30, are not excessively small. Therefore, the smooth inflation and deployment of the airbag 5 are achieved.

The embodiment shown above is an example of the present invention, and the present invention may take various modes.

For example, although the rear edge 20r side of the lid 20 is also engaged with the peripheral edge portion of the opening 3a by the clips 30 in the embodiment shown above, the rear edge 20r side does not have to be engaged by the clips 30. The configuration of the clip is not limited to the configuration of the embodiment shown above. The lid may be engaged with the vehicle body using the engaging portions other than the clips. The number of hinges may be two, or four or more.

Although the lid 20 is joined to the rear edge side of the opening 3a of the hood 3 via the hinges 21 in the embodiment shown above, it may be joined to the rear edge side of the case 8. Although the lid 20 is engaged with the peripheral edge portion of the opening 3a of the hood 3 by the clips 30 (engaging portion), it may be engaged with the peripheral edge portion of the case 8. In other words, it is also possible that the lid is joined via the hinges, and the vehicle body engaged by the engaging portion may be replaced by the case.

Although not shown, it is apparent that the pedestrian air bag apparatus in which the front edge of the lid is rotatably joined to the vehicle body via the hinges, and the rear edge thereof is engaged by the engaging portion is also applicable to the present invention.

The present application is based on Japanese Patent Application (Patent Application No. 2006-016324) filed as of Jan. 25, 2006, the entire part of which is incorporated herein by reference.

The invention claimed is:

1. A pedestrian airbag apparatus comprising:
an airbag which is inflated along at least part of a rear portion of a hood,
a case extending in the vehicle width direction and including the airbag stored therein,
an inflator for inflating the airbag, and
a lid arranged above the case, the lid being rotatably connected at a first edge which is one of a front edge and a rear edge thereof to a vehicle body via hinges and being engaged at a second edge which is the other one of the front edge and the rear edge thereof with the vehicle body by second edge engaging portions,
wherein the positions of the hinges at the first edge and the positions of the second edge engaging portions are shifted in the vehicle width direction.

2. The pedestrian airbag apparatus according to claim 1, further comprising a first edge engaging portion for engaging the first edge of the lid with the vehicle body, wherein the positions of the first edge engaging portions and the positions of the second edge engaging portions are shifted in the vehicle width direction.

3. The pedestrian airbag apparatus according to claim 1, wherein the hood is provided with an opening on a rear portion thereof, the case is arranged on the lower side of the opening, and the lid is mounted to the opening.

4. The pedestrian airbag apparatus according to claim 3, wherein the engaging portion is a leaf spring strip secured at one end to the lid and protruded at the other end to the lower side of an edge portion of the opening.

5. The pedestrian airbag apparatus according to claim 1, the wherein a leftmost hinge in the vehicle width direction is apart from a left end of the lid, and a leftmost second edge engaging portion is provided at the second edge so as to face a position between the leftmost hinge and the left end of the lid, and a rightmost hinge in the vehicle width direction is apart from a right end of the lid and a rightmost second edge engaging portion is provided at the second edge so as to face a position between the rightmost hinge and the right end of the lid.

6. The pedestrian airbag apparatus according to claim 1, wherein the second edge engaging portions are provided at the second edge so as to face positions between the hinges.

7. The pedestrian airbag apparatus according to claim 1, wherein the lid is attached to the hood via the hinges and the second edge engaging portions.

8. The pedestrian air bag apparatus according to claim 1, wherein the lid is attached to the case via the hinges and the second edge engaging portions.

* * * * *